UNITED STATES PATENT OFFICE.

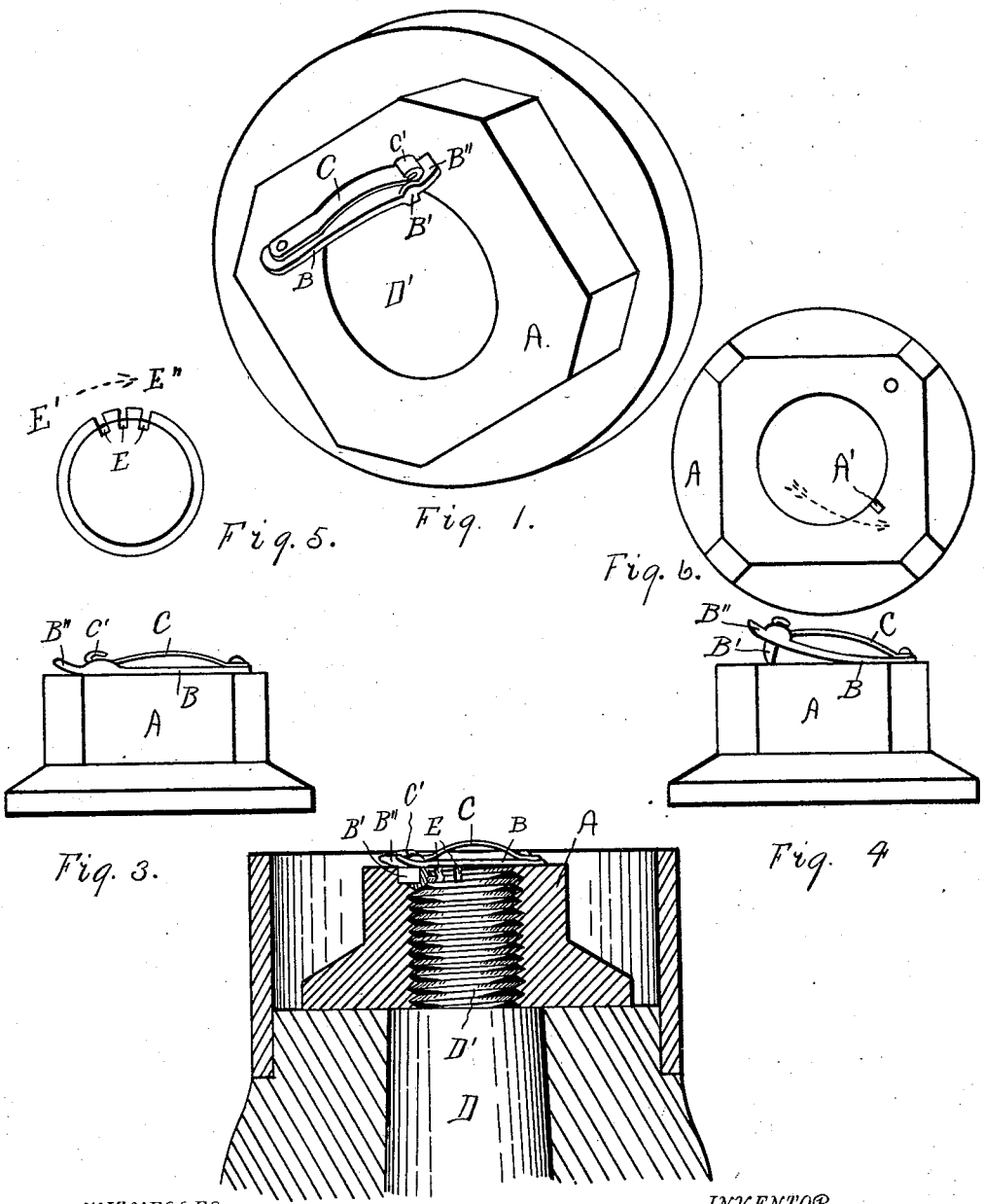

SAMUEL W. R. MITCHELL, OF BURROWS, INDIANA.

NUT-LOCK.

SPECIFICATION forming part of Letters Patent No. 565,911, dated August 18, 1896.

Application filed April 13, 1896. Serial No. 587,285. (No model.)

*To all whom it may concern:*

Be it known that I, SAMUEL W. R. MITCHELL, a citizen of the United States, residing at Burrows, in the county of Carroll and State of Indiana, have invented certain new and useful Improvements in Nut-Locks; and I do hereby declare the following to be a full, clear, and exact description of the invention, such as will enable others skilled in the art to which it appertains to make and use the same, reference being had to the accompanying drawings, forming a part of this specification.

The invention relates to new and useful improvements in nut-locks; and it consists in the construction and arrangement of parts as hereinafter fully set forth, and pointed out particularly in the claims.

The object of the invention is to provide a nut-lock especially adapted for use on vehicle-axles or other places where the threaded end of the axle or bolt is clear and free, so that this improved lock may be applied thereto, the object also being to provide a lock that shall be cheap and simple of construction, as well as effective in its operation, and one that may be turned upon the face of the nut so that said nut may be turned down or screwed onto an axle, bolt, &c., by the use of a wrench or other means, which object is attained by the construction illustrated in the accompanying drawings, in which—

Figure 1 is a perspective view of a nut with my improved lock mounted thereon, the end of the axle being shown with the nose of the lock embedded therein. Fig. 2 is a vertical section through a hub and nut, a portion of the threads of said nut being broken away to more clearly show the operation and location of the locking parts. Fig. 3 is a side elevation of a nut with one of my improved locks thereon, said view clearly showing the position of parts in their normal position or when locking a nut upon the end of an axle or axle-skein. Fig. 4 is a view similar to Fig. 3, showing the nose of the lock raised out of its seat and resting upon the surface of the nut, which is the position in which the parts of the lock are placed while said nut is being screwed upon an axle. Fig. 5 is a view of the end of an axle or axle-skein, showing several seats in the threads thereof for the reception of the nose of the lock, as hereinafter described; and Fig. 6 is a plan view of a nut, showing the seat therein for the reception of a portion of the nose of the lock, said view also showing a threaded aperture into which a suitable screw is entered for the purpose of holding the spring-tongue and "riding spring" pivotally in place upon the face of the nut, as hereinafter fully set forth.

Referring to the letters of reference, A designates a nut of the pattern commonly employed upon omnibuses, hose-wagons, trucks, &c. Pivoted near one corner of said nut is a spring-tongue B, and secured upon said tongue by means of the same screw or rivet which holds said tongue in place upon the nut is a riding spring C.

D designates the outer or threaded end of an axle bearing or skein, and formed in the threads of the portion D' thereof is a series of seats or notches E.

Extending into the face of the nut A from the inner threaded opening therethrough is a seat A', said seat being of the same width and depth as the seats E. Projecting from the under side of the spring-tongue B is a nose B'. The sides of said tongue directly above said nose are turned upward, as clearly shown, forming a seat or guideway for the end C' of the riding spring C.

The operation of applying and locking a nut provided with this improved lock is as follows: The spring-tongue B is raised by means of the lip B'' until the nose B' of said spring is elevated above the face of the nut, when said tongue is moved in the direction of the dotted line in Fig. 4, said lip B'' released, and the nose allowed to rest upon the face of the nut, as clearly shown in said figure. It will thus be seen that a clear passage-way through the threads of the nut is afforded, thereby allowing said nut to be screwed down upon the axle by a wrench or other means until it bears against the outer face of the hub. When the nut has been screwed to its place upon the threaded portion D' of the axle, the free end of the spring-tongue B is moved toward the center of the nut, or in the opposite direction to which it was moved after the nose B was raised out of its seat, until said nose comes directly over the seat A', and if said seat is opposite one of the seats E said nose will be seated so that one half of its width will be in the seat A', while the other half will be seated in one of the seats E by means of the spring C through the end C' bearing directly thereabove, as will be understood. If the seat A' should not stand opposite one of the seats E, said nut may be turned until it does. Should the nose B' be seated in the seat E' (see Fig. 5) and it be found that said nut bound against the face of the hub, thereby causing an undesirable amount of friction, said nut may be turned back to loosen it, when the nose B' may be seated in the seat E'' or in any seat between said seats E' and E'', as will be well understood. It will be evident that any desired number of seats E may be formed in the threads. It is desirable that said seats E be formed in the upper side of the axle or skein, so that the locking parts may be kept free from oil.

Having thus fully set forth my invention, what I claim as new, and desire to secure by Letters Patent, is—

1. In a nut-lock, the combination of the nut, the spring-tongue pivoted to the face thereof, the nose on said tongue, the spring bearing upon said tongue, the recess in said nut, the recesses in the threaded end of the axle adapted to register with the recess in said nut, and the nose on the tongue adapted to engage in the recesses in the bolt and nut for the purpose set forth.

2. In a nut-lock, the combination of the nut, the tongue pivoted to the face thereof, the nose on said tongue, the spring pivoted at one end to said tongue, the opposite end of said spring bearing upon said tongue directly above the nose thereon, the guideway formed on said tongue for guiding the free end of said spring, the seat in said nut, the corresponding seats in the threads of the axle, and the tongue adapted to engage the recesses of said bolt and nut substantially as and for the purpose set forth.

In testimony whereof I affix my signature in presence of two witnesses.

SAMUEL W. R. MITCHELL.

Witnesses:
JOHN M. ALBERT,
CLARENCE W. BANKS.